3,205,247
TRICHLOROVINYL THIOCYANATE AND METHOD OF PREPARATION

Edward D. Weil, Lewiston, Emil J. Geering, Grand Island, and Keith J. Smith, Lockport, N.Y., assignors to Hooker Chemical Corporation, Niagara Falls, N.Y., a corporation of New York
No Drawing. Filed Feb. 14, 1963, Ser. No. 258,596
4 Claims. (Cl. 260—454)

This invention comprises a new and useful composition of matter, trihalovinyl thiocyanate, especially trichlorovinyl thiocyanate, and active biotoxicant.

This is a continuation-in-part of our copending applications, Serial No. 800,981, filed March 23, 1959, now abandoned, and Serial No. 93,298, filed March 6, 1961, and now abandoned.

Synthetic routes to trichlorovinyl thiocyanate have hitherto been lacking. The replacement of a chlorine atom on tetrachloroethylene by reaction with a thiocyanate fails to occur, in keeping with the usual inertness of the vinylic chlorine atoms. The chlorination of vinyl thiocyanate would give an additional product, not substitution of hydrogens, in keeping with the normal mode of reaction of ethylene with chlorine.

Our discovery of new synthetic intermediates, having novel modes of reaction, has now made possible the convenient and inexpensive synthesis of trihalovinyl thiocyanate. These compounds are active against microorganisms, e.g., fungi, bacteria, nematodes and other microscopic organisms, which may be detrimental to higher plant and/or animal life. Therefore, they may be referred to as biotoxicants, which compounds control and prevent the growth of such microorganisms when applied to the sites thereof. Specifically, we have found that our new intermediate, tetrachloroethane sulfenyl chloride, which is the subject of U.S. Patent No. 3,200,146 filed October 29, 1962, which is also a continuation-in-part of S.N. 800,981, undergoes reaction with two or more molar equivalents of a metal cyanide to yield trichlorovinyl thiocyanate.

$$CHCl_2-CCl_2SCl$$

or

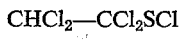
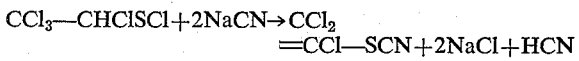

This reaction is contrary to that observed by Brintzinger (Chemische Berichte, 87, 319 (1954)) with $CH_2Cl-SCl$, which yielded $CH_2(CN)SCN$ upon reaction with KCN. By analogy with the prior art, a trichloro-1-cyanoethyl thiocyanate would be expected, but is not observed to be formed.

The process of the invention may be carried out at temperatures in the range of −40 degrees centigrade to the boiling point of the tetrachloroethanesulfenyl chloride, but is preferably performed in the range of −10 degrees to +140 degrees centigrade. At lower temperatures the reaction proceeds but may be sluggish. At higher temperatures thermal decomposition may become excessive.

The cyanide employed may be an alkali cyanide or an alkaline earth cyanide, preferably the former and, for economic reasons, preferably sodium or potassium cyanide.

While not necessary, the use of a solvent for the cyanide is preferred because of its favorable effect on the rate and completeness of reaction. Suitable solvents are, for example, water, alcohols (particularly lower aliphatic alcohols such as methanol and alkoxy-alkanols such as Cellosolve), dimethylformamide, dimethylacetamide, dimethylsulfoxide, lower aliphatic ketones such as acetone, and lower aliphatic nitriles such as acetonitrile.

Pressures of atmospheric or near atmospheric are preferred although higher or lower pressures may be employed. The sulfenyl chloride may be added to the cyanide, the cyanide may be added to the sulfenyl chloride compounds, or both may be added simultaneously to the solvent. Agitation is advantageous during the course of the admixture. The product is conveniently isolated by fractional distillation of the organic phase of the reaction mixture.

Trichlorovinyl thiocyanate is a liquid of boiling point 50-55 degrees centigrade (1.5 millimeters), with a characteristic penetrating odor. Its infrared spectrum confirms the presence of the carbon-to-carbon double bond and the thiocyanate functional group.

To further make clear the process of our invention, the following example is given:

Example

Three hundred ninety-eight parts by weight of bis(tetrachloroethyl) disulfide (prepared by the reaction of trichloroethylene with sulfur monochloride as described in copending U.S. Patent No. 3,088,818 filed March 23, 1959), is cooled to minus 20 degrees centigrade and is treated with gaseous chlorine with agitation and cooling to maintain this temperature. After the weight has increased to 469 parts, the mixture is allowed slowly to rise to room temperature, then is fractionated through a packed fractionating column at approximately three theoretical plates. The product taken off as a fraction boiling at 53 to 57 degrees centigrade (0.5 millimeter), is a malodorous yellow liquid having a specific gravity of 1.760 at 23 degrees centigrade, having the correct analysis for a tetrachloroethanesulfenyl chloride.

*Analysis.*—Calculated for $C_2HCl_5S$: Cl, 75.7%; S, 13.6%. Found: Cl, 76.2%; S, 13.5%.

By gas chromatography over a 250 cm. column packed with silicone grease on 30–60 mesh inert silicaceous support and maintained at 120 degrees centigrade the product was resolved into two isomers. The one isomer having the shorter retention time comprised 83 percent of the mixture. It was identified as the 1,2,2,2-tetrachloroethanesulfenyl chloride by the fact that its nuclear magnetic resonance spectrum measured at 60 megacycles on a Varian A60 NMR spectrograph, showed a proton resonance at 344 cycles per second (relative to tetramethylsilane as standard), indicating less shielding of the proton compared to that in the other isomer. The other isomer, having the longer retention time, comprised 17 percent of the mixture. It was identified as the 1,1,2,2-tetrachloroethanesulfenyl chloride by the nuclear magnetic resonance spectrum which showed a proton resonance at 370 cycles per second (reactive to tetramethylsilane as standard) indicating greater shielding of the proton (as would be caused by a greater number of adjacent chlorine atoms), relative to the other isomer.

The bis(tetrachloroethyl) disulfide starting material was therefore a mixture of bis(1,2,2,2-tetrachloroethyl) disulfide, bis(1,1,2,2-tetrachloroethyl) disulfide and

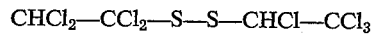

A solution of 26 parts by weight of potassium cyanide in three hundred twenty parts of methanol was stirred at 0–10 degrees centigrade and 46.9 parts by weight of the tetrachloroethanesulfenyl chloride (prepared as described above), was added dropwise over one hour. Cooling was used to hold the temperature at 0–10 degrees centigrade. The reaction mixture was stirred for an hour after addition was complete, the methanol was stripped off under water aspirator vacuum, then water was added to dissolve the inorganic salts and the heavy organic oil was separated and fractionated in a still to isolate the desired product in good yield as a red oil boiling at 50–55 degrees centigrade (1.5 millimeters).

*Analysis.*—Calcd. for $C_3Cl_3SN$: Cl, 56.6%; N, 13.1%. Found: Cl, 56.4%; N, 13.2%.

The remarkable nematocidal utility of trichlorovinyl thiocyanate is shown by the following test. Into soil infected with *Meloidogyne incognita* (a common nematode causative of root knot disease of tobacco, tomato, cucumber, etc.) was admixed trichlorovinyl thiocyanate at the rate of 0.1 gram of chemical per gallon of soil. After three days, healthy cucumber seedlings were transplanted into the treated soil and allowed to grow therein under greenhouse conditions. One month later, the cucumber plants were uprooted and their root systems were found to be entirely free of the galls which are characteristic symptoms of root knot disease, whereas in control experiments wherein the chemical was omitted, the roots were severely galled and the plants were badly stunted by nematode-produced root lesions. To give the same protective effect as 0.1 gram of trichlorovinyl thiocyanate per gallon of soil, 1 gram of the commercial nematocide "D-D mixture" (dichloropropane-dichloropropene) per gallon of soil was required. A very high degree of fungicidal activity is also shown by trichlorovinyl thiocyanate as shown by the following test: soil heavily infested with spores of Pythium was admixed with trichlorovinyl thiocyanate at 50 p.p.m. Beans were planted therein and also in infested untreated soil for comparison. In the untreated soil, none of the beans emerged because of damping off, whereas in the treated soil, 100 percent of the beans emerged normally.

The compound of the invention is also bactericidal and/or bacteriostatic, and, for example, was found to inhibit the growth of *Escherichia coli* and *Staphylococcus aureus* at 19 parts per million on nutrient agar.

When corresponding other halogenated reactants are employed, corresponding halogenated biotoxicants are obtained, e.g., the bromine derivatives.

Various modifications can be made to the above description and we do not wish to be limited thereto except as defined in the appended claims.

We claim:
1. Trichlorovinyl thiocyanate.
2. A process for the production of trichlorovinyl thiocyanate by bringing tetrachloroethanesulfenyl chloride into contact with a metal cyanide at a temperature within the range of —40 degrees centigrade to the boiling point of tetrachloroethanesulfenyl chloride.
3. A process in accordance with claim 2 wherein the cyanide is sodium cyanide.
4. A process in accordance with claim 2 wherein the cyanide is potassium cyanide.

References Cited by the Examiner
UNITED STATES PATENTS

| | | | |
|---|---|---|---|
| 2,214,971 | 9/40 | Muller | 260—454 |
| 2,572,564 | 10/51 | Himel et al. | 260—454 |
| 2,613,221 | 10/52 | Ladd et al. | 260—454 XR |
| 2,671,799 | 3/54 | Miller | 260—454 XR |
| 2,859,235 | 11/58 | Schmidt et al. | 260—454 |
| 2,867,562 | 1/59 | Lamb | 167—22 |
| 2,913,368 | 11/59 | Birum | 167—22 |
| 3,010,947 | 11/61 | Hwa | 260—454 XR |

OTHER REFERENCES

Childs et al., J. Chem. Soc. (London), vol. of 1948, pp. 2180–2183.

Mardzhanyan et al., C. A., vol. 51, p. 12412f (1957).

Prochazka et al., Collections Czech. Chem. Communs., vol. 14, pp. 156–161 (1949).

Schmidt et al., Ann. der Chem., vol. 560, pp. 222–231 (1948).

CHARLES B. PARKER, *Primary Examiner.*